(12) United States Patent
Gulick

(10) Patent No.: US 6,816,935 B1
(45) Date of Patent: Nov. 9, 2004

(54) INTERRUPT AND STATUS REPORTING STRUCTURE AND METHOD FOR A TIMESLOT BUS

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 423 days.

(21) Appl. No.: 09/798,456

(22) Filed: Mar. 2, 2001

(51) Int. Cl.⁷ .............................................. G06F 13/24
(52) U.S. Cl. ...................................... 710/260; 710/266
(58) Field of Search .......................... 710/48, 50, 260, 710/262, 264, 266, 267, 269

(56) References Cited

U.S. PATENT DOCUMENTS

| | | | |
|---|---|---|---|
| 5,185,864 A | * 2/1993 | Bonevento et al. | 710/48 |
| 5,287,523 A | * 2/1994 | Allison et al. | 710/50 |
| 5,594,905 A | * 1/1997 | Mital | 710/260 |
| 5,764,996 A | * 6/1998 | Armstrong et al. | 710/260 |
| 5,778,445 A | 7/1998 | Ooe et al. | |
| 5,812,881 A | 9/1998 | Ku et al. | |
| 5,850,558 A | * 12/1998 | Qureshi et al. | 710/269 |
| 5,941,976 A | * 8/1999 | Gulick | 710/260 |
| 5,943,507 A | 8/1999 | Cornish et al. | |
| 6,032,213 A | * 2/2000 | Gulick | 710/312 |
| 6,263,075 B1 | 7/2001 | Fadavi-Ardekani et al. | |

OTHER PUBLICATIONS

"Audio/Modem Riser Specification, Revision 1.01," Intel Corporation, 1998.
"Audio Codec '97, Revision 2.2," Intel Corporation, Sep., 2000.

* cited by examiner

*Primary Examiner*—Khanh Dang
(74) *Attorney, Agent, or Firm*—Meyertons Hood Kivlin Kowert & Goetzel, P.C.; B. Noël Kivlin

(57) ABSTRACT

An interrupt and status reporting method and structure for a timeslot bus communications protocol. In one embodiment, a peripheral bus is a timeslot bus configured to transmit information across the bus in frames. Each frame may include at least one timeslot dedicated to reporting interrupt and status information to a host computer system. An interrupt request bit may be transmitted by a peripheral to a peripheral bus host controller, and may signal a request for an interrupt by a peripheral device. The requesting peripheral device may also transmit a cause code, which may include general information about the cause of the interrupt request, and a parameter field, which may include specific information about the cause of the interrupt request. Additionally, a peripheral device may be configured to use the interrupt and status reporting structure to request data to be transmitted to it from a host controller.

23 Claims, 7 Drawing Sheets

| | Slot 0 | Slot 1 | Slots 2:14 | Slot 15 |
|---|---|---|---|---|
| Pin 0 | Frame/Slot Valid | Write Data [15:0] | Stream Data | CMD [15:12] Parameter [11:0] |

Fig. 2A

| | Slot 0 | Slot 1 | Slots 2:14 | Slot 15 |
|---|---|---|---|---|
| Pin 0 | Frame/Slot Valid | Write Data [15:0] | Stream Data | CMD [15:12] Parameter [11:0] |
| Pin 1 | Reserved | Write Data [31:16] | Stream Data | Reserved |

Fig. 2B

Pin 0

| Bit | 15 | 14 | 13:0 |
|---|---|---|---|
| | Frame | WrData | |

Fig. 2C

Tx Timeslot 15

| Bits 15:12 | Bits 11:0 |
|---|---|
| Command | Parameter |

| Bits 15, 14, 13, 12 | Command |
|---|---|
| 0000 | Read Byte |
| 0001 | Read Word |
| 0010 | Read DWord |
| 0011 | Reserved |
| 0100 | Write Byte |
| 0101 | Write Word |
| 0110 | Write DWord |
| 0111 | Reserved |
| 1000 | Peripheral Specific |
| 1111:1001 | Reserved |

| Bits 3, 2, 1, 0 | Timeslot for Stream B Pointer | Example of Stream A Length |
|---|---|---|
| 0000 | Slot 2 | Stream A = 0, Stream B + U = 13 |
| 0001 | Slot 3 | Stream A = 2, Stream B + U = 12 |
| 0010 | Slot 4 | Stream A = 3, Stream B + U = 11 |
| 0011 | Slot 5 | Stream A = 3, Stream B + U = 10 |
| ---- | ---- | ---- |
| 1010 | Slot 13 | Stream A = 11, Stream B + U = 2 |
| 1011 | Slot 14 | Stream A = 12, Stream B + U = 1 |
| 1100 | None | Stream A = 13, Stream B + U = 0 |
| 1111:1101 | Reserved | |

Fig. 4

| | Slot 0 | Slot 1 | Slots 2:14 | Slot 15 |
|---|---|---|---|---|
| Pin 0 | Frame/Slot Valid | Read Data [15:0] | Stream Data | IntReq/Cmd; Transmit Data Request |

Fig. 5A

| | Slot 0 | Slot 1 | Slots 2:14 | Slot 15 |
|---|---|---|---|---|
| Pin 0 | Frame/Slot Valid | Read Data [15:0] | Stream Data | IntReq/Cmd; Transmit Data Request |
| Pin 1 | Reserved | Read Data [31:16] | Stream Data | Reserved |

Fig. 5B

Pin 0

| Bit | 15 | 14 | 13:0 |
|---|---|---|---|
| | Frame | RdData | |

Fig. 5C

Pin 0

| Bit | 15:3 | 2 | 1 | 0 |
|---|---|---|---|---|
| | IntReq | Reserved | Stream B Data Request | Stream A Data Request |

Fig. 5D

Pin 0, Timeslot 15

| Bit | 15 | 14:11 | 10:2 | 2:0 |
|---|---|---|---|---|
| | IntReq | Interrupt Cause | Parameter | Tx Data Req |

Fig. 6A

| Bits 14:11 | Cause | Parameter Field Definition |
|---|---|---|
| 0000 | Unspecified | None |
| 0001 | Critical Error | Error Code |
| 0010 | Non-Critical Error | Error Code |
| 0011 | General Status Change | Address of the status register |
| 0100 | GPIn0 Change | State of first 8 General Purpose Inputs |
| 0101 | GPin1 Change | State of the second 8 General Purpose Inputs |
| 0110 | Reserved | |

Fig. 6B

INTERRUPT AND STATUS REPORTING STRUCTURE AND METHOD FOR A TIMESLOT BUS

BACKGROUND OF THE INVENTION

1. Field of the Invention

This invention relates to input/output (I/O) buses, and more specifically, to interrupt reporting schemes for devices sharing such buses.

2. Description of the Relevant Art

With continuous advances in computer systems, manufacturers of peripheral devices have created a large number of new devices. Problems that arise from new devices often times drives the creation of new input/output (I/O) buses to overcome these problems. Examples of such I/O bus architectures include the Peripheral Component Interface (PCI) bus, Universal Serial Bus (USB), and the Advanced Graphics Port (AGP). Each of these bus architectures was developed to solve specific problems related to various types of peripherals that now utilize these buses.

Various problems must be solved in order to implement a new bus type. One such problem is the interfacing of the bus to a computer system. Each new bus type must include a hardware mechanism in order to allow it to communicate with a host computer system. Furthermore, communications protocols must be developed to allow a hardware interface to communicate with devices coupled to the peripheral bus. The hardware interface must also be configured to communicate with a bus interface in a host computer system, and must include mechanisms for reporting interrupt and status information of the various peripheral devices to the host computer.

With respect to communications protocols, several factors must be considered. In the case of a serial time-division bus which uses frames, the organization of the frames is an important factor. Frames may be structured to carry various types of commands and data, and must be able to allow a host computer system to determine control and status information for each peripheral device coupled to the bus. Interrupt reporting and handling is another factor that must be considered in organizing a frame structure for a time division bus. Furthermore, it may be necessary to organize a frame structure to carry large amounts of stream data between a peripheral device and a host computer system.

Interrupt and status reporting may be another function of a communications protocol for a serial time-division bus. Peripheral devices coupled to the bus may be capable of requesting an interrupt from a host computer system. In many such computer systems, the processor must then poll each device to determine the source of the interrupt. This may require a bus read by the processor, which may raise latency issues, since a processor typically operates at a much higher clock rate than a peripheral bus. Futhermore, peripheral devices may from time to time need to report a change of status (such as a change from an active to inactive mode) to a host computer system. Such reporting may also require a bus read by a processor, thus raise further latency issues.

SUMMARY OF THE INVENTION

The problems outlined above are in large part solved by an interrupt and status reporting method and structure for a timeslot bus communications protocol. In one embodiment, a peripheral bus is a timeslot bus configured to transmit information across the bus in frames. Each frame may include at least one timeslot dedicated to reporting interrupt and status information to a host computer system. An interrupt request bit may be transmitted by a peripheral to a peripheral bus host controller, and may signal a request for an interrupt by a peripheral device. The requesting peripheral device may also transmit a cause code, which may include general information about the cause of the interrupt request, and a parameter field, which may include specific information about the cause of the interrupt request. Additionally, a peripheral device may be configured to use the interrupt and status reporting structure to request data to be transmitted to it from a host controller.

In one embodiment, the information interrupt and status information transmitted from a peripheral device to a host controller may be stored in registers of the host controller. This may allow a processor of a host computer system to determine the source of the interrupt request, as well as related information (the cause code and parameter fields) without being forced to conduct a bus read. Since many processors operate at a higher clock speed than a various peripheral buses, the ability to obtain information without performing a bus read may prevent latency issues that would otherwise arise due to the different clock speeds.

The interrupt and status reporting structure may also include one or more bits for requesting data from the host computer system. In one embodiment, bits are present for requesting data to be transmitted in one of two different data streams. The data transmitted in the streams may be any type of data used or processed by the peripheral (e.g. data to be transmitted onto a network by a network interface card).

Thus, in various embodiment, the interrupt and status reporting method and structure may allow for more efficient reporting of interrupt and status information to a host computer system. This may allow for more efficient handling of interrupts requested by peripherals coupled to a peripheral bus. Additionally, the interrupt and status reporting structure may allow a peripheral device to request data transmissions from a host computer system.

BRIEF DESCRIPTION OF THE DRAWINGS

Other objects and advantages of the invention will become apparent upon reading the following detailed description and upon reference to the accompanying drawings in which:

FIG. 2A is a drawing of one embodiment of a transmit frame structure for a digital subscriber line (DSL) peripheral interconnect bus operating in a single-pin mode;

FIG. 2B is a drawing of one embodiment of a transmit frame structure for a DSL peripheral interconnect bus operating in a dual-pin mode;

FIG. 2C is a drawing of one embodiment of a first timeslot of a transmit frame structure for a DSL peripheral interconnect bus;

FIG. 4 is a table listing codes which indicate the division of independent data streams which may be conveyed in one embodiment of a data protocol structure for a timeslot bus;

FIG. 5A is a drawing of one embodiment of a receive frame structure for a DSL peripheral interconnect bus operating in a single-pin mode;

FIG. 5B is a drawing of one embodiment of a receive frame structure for a DSL peripheral interconnect bus operating in a dual-pin mode;

FIG. 5C is a drawing of one embodiment of a first timeslot for a receive frame structure of a DSL peripheral interconnect bus;

FIG. 5D is a drawing of one embodiment of a last timeslot of a receive frame structure, wherein the last timeslot includes information concerning interrupts as well as requests for data;

FIG. 6A is a drawing of one embodiment of an interrupt and status reporting structure in a last timeslot of a receive frame for a DSL peripheral interconnect bus; and FIG. 6B is a list of codes indicating interrupt causes for one embodiment of an interrupt and status reporting structure for a DSL peripheral interconnect bus.

Figure 1A:
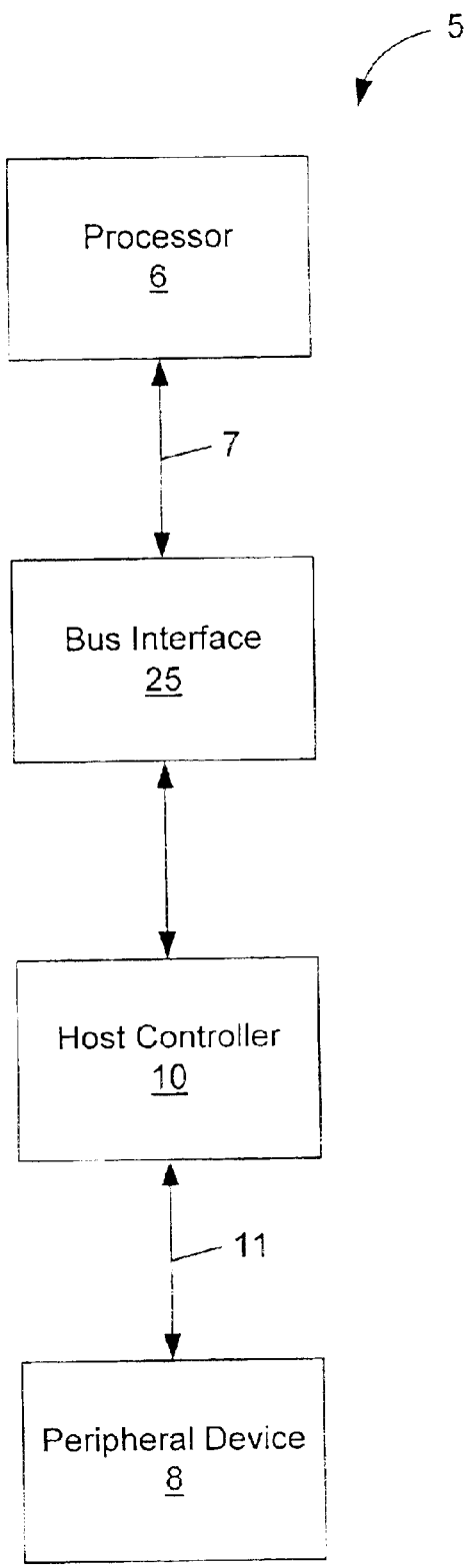
FIG. 1 is a block diagram of one embodiment of a hardware architecture for a host controller of a peripheral bus.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Turning now to FIG. 1A, a block diagram of one embodiment of a computer system is shown. Computer system 5 includes a processor coupled to bus interface unit 25 via processor bus 7. Embodiments including multiple processors are possible and contemplated. Bus interface 25 may be coupled to host controller 10, which may be a host controller for a peripheral bus. Host controller 10 may be coupled to one or more peripheral devices 8 through peripheral bus 11. In the embodiment shown, only one peripheral device is shown coupled to the host controller, although generally speaking, there is no specific limit to the number of peripherals that may be coupled to host controller 10.

Figure 1B:
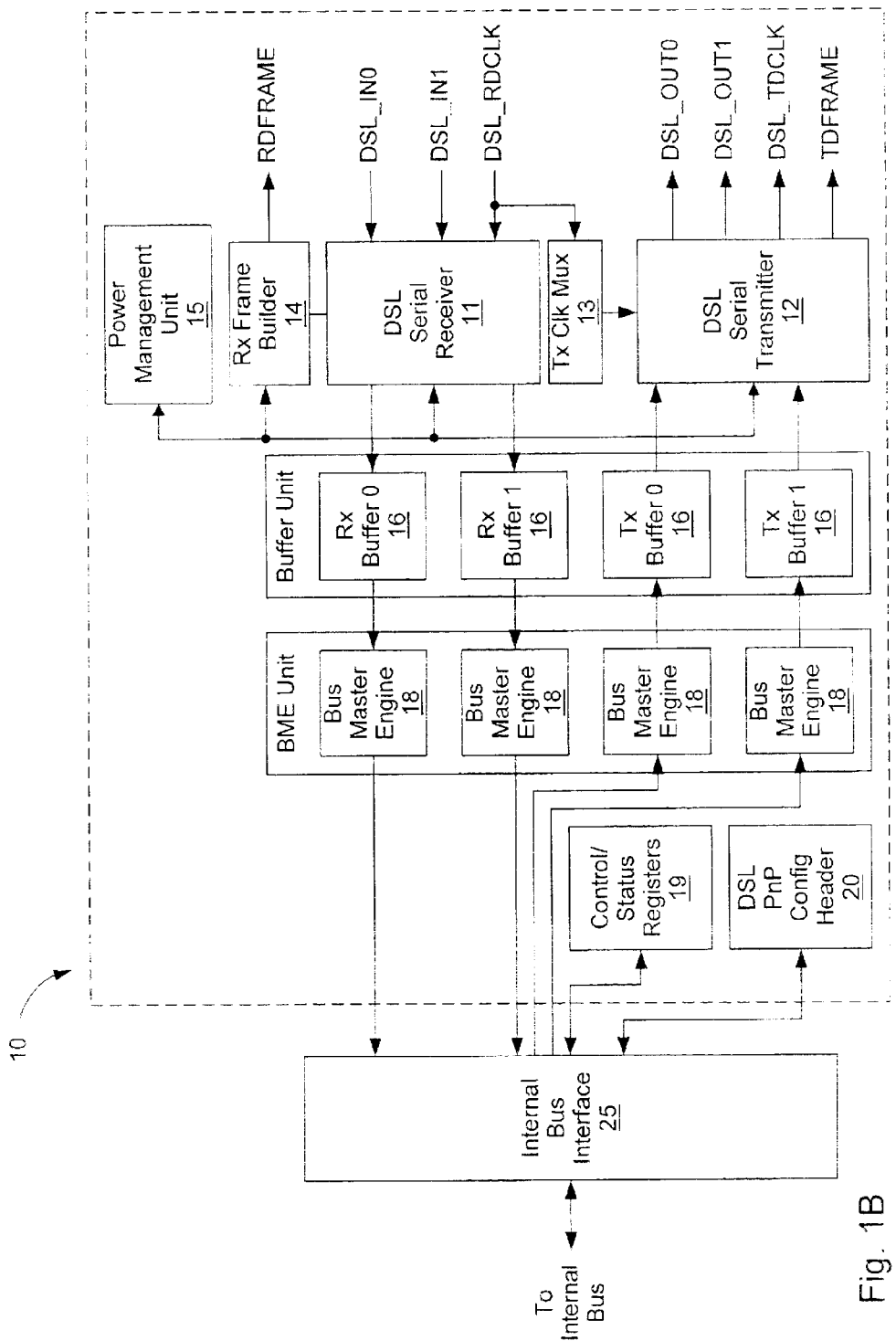

Turning now to FIG. 1B, a block diagram of one embodiment of a hardware architecture for a host controller of a peripheral bus is shown. Host controller 10, in this embodiment, is configured for control of a serial bus. More specifically, in the embodiment shown, the bus is a digital subscriber line (DSL) peripheral interconnect bus. Embodiments using other types of buses, both serial and parallel, are possible and contemplated. In the embodiment shown, the DSL peripheral interconnect bus may operate in a single-pin mode, or in a dual-pin mode. In the single-pin mode, only one transmission line is used for transferring data, while two transmission lines are used in the dual-pin mode. Furthermore, the DSL peripheral interconnect bus may be configured for Asynchronous DSL (ADSL) operation, and may be further configured to operate as an "ADSL Lite" (sometimes referred to as G.Lite) bus. The primary difference between standard ADSL and ADSL Lite is the use of a POTS (plain old telephone system) splitter at a user site, wherein the splitter may employ filters to separate the low frequencies of the telephone audio spectrum from the higher frequencies of the DSL signals. In embodiments where the DSL peripheral interconnect bus is not used to convey signals in the telephone audio spectrum, it may be possible to eliminate the POTS splitter. The DSL peripheral interconnect bus may be further configured for operation as a timeslot bus, as will be explained in further detail below.

Host controller 10 may interface with the peripheral bus through receiver unit 11 and transmitter unit 12. Receiver unit 11 is configured to receive signals DSL_IN0 and DSL_IN1 signals through corresponding transmission lines. When operating in a single-pin mode, receiver unit 11 may receive data through the transmission line corresponding to the DSL_IN0 signal (or pin 0). When operating in a dual-pin mode, receiver unit 11 may receive signals through transmission lines corresponding to both the DSL_IN0 and DSL_IN1 signals (pin 0 and pin 1). Receiver unit 11 may also be configured to receive a DSL_RDCLK signal, which is a clock signal input to receiver unit 11 by a peripheral coupled to the bus. This clock signal may also be driven to transmit clock multiplexer 13, the operation of which will be described in further detail below.

Receiver unit 11, in the embodiment shown, is coupled to receive frame builder 14. Receive frame builder 14 may be configured to drive the RDFRAME signal to peripherals coupled to the bus. The RDFRAME signal may be a synchronization signal sent to a peripheral in order to synchronize timing between receiver unit 11 and the peripheral in order that frames may be sent. When the link between receiver unit 11 and a peripheral is inactive, this signal may be held low, for this embodiment. When the link is activated, the RDFRAME signal may be held high for 16 bit-times (i.e. bus cycles) prior to the peripheral transmitting a first timeslot of a first frame, thereby indicating to the peripheral that receiver unit 11 is ready to receive data. In other embodiments, the RDFRAME signal may be held high when disabled, and may be activated by being held low.

Similar to receiver unit 11, transmitter unit 12 may also be configured for operations in a single-pin mode and a dual-pin mode. In single-pin mode, transmitter unit 12 may drive signals onto a transmission line corresponding with the DSL_OUT0 signal. In dual-pin mode, transmissions may be carried out on transmission lines corresponding to both the DSL_OUT0 and DSL_OUT1 signals.

Transmitter unit 12 may also be configured to drive a clock signal to a peripheral coupled to the bus, designated here as DSL_TDCLK. This clock signal may be received by transmitter unit 12 from transmitter clock multiplexer 13, to which it is coupled in the embodiment shown. Transmitter clock multiplexer 13 may be configured to select one of multiple clock signals for transmitter unit 12. In the embodiment shown, transmitter clock multiplexer may select either the DSL_RDCLK signal, or the CLK signal. As previously stated, the DSL_RDCLK signal may be received from a peripheral coupled to the bus. The CLK signal may be a clock signal from another bus in a computer system in which host controller 10 is implemented. In one embodiment, the CLK signal may be a 33 MHz clock signal from a peripheral component interface (PCI) bus.

Transmitter unit 12 may also be configured to drive a synchronization signal to a peripheral coupled to the bus, designated here as TDFRAME. This signal may normally be held low when the link to peripheral is disabled. Prior to transmission of the first slot of a first frame by transmitter unit 12, the TDFRAME signal may be held high for 16 bit-times, or bus cycles. This may provide an indication to a peripheral that transmitter unit 12 is preparing to transmit frames to the peripheral.

Host controller 10 may also include a plurality of data buffers. In the embodiment shown, host controller 10 includes two receive buffers 16 and two transmit buffers 17. In the embodiment shown, receiver buffers 16 include Rx Buffer 0 and Rx Buffer 1, while transmit buffers 17 include Tx Buffer 0 and Tx buffer 1. Thus, in the embodiment shown, both receive buffers 16 and transmit buffers 17 are configured to support operations on the DSL peripheral interconnect bus in either single-pin mode or dual-pin mode. Receiver buffers 16 are coupled to receiver unit 11, while transmit buffer 17 are coupled to transmitter unit 12. The buffers may provide temporary storage for data transferred between a computer system and a peripheral coupled to the bus. This may help alleviate problems caused by latency in reading and writing data to the memory of a computer system, as well as any latency that may be encountered when transferring data to or from a peripheral. In some embodiments, each of the buffers may be part of a larger buffer unit, while in other embodiments, the buffers may be distributed, depending on what best suits the specific implementation.

Coupled to each of the buffers shown is a bus master engine (BME) 18. Each BME 18 may be configured to function as a direct memory access (DMA) controller. During operations of the host computer system, software running on the host CPU may create a data structure in system memory. This data structure may be referred to as a descriptor table. The descriptor table may be configured to provide information to each BME 18 as to where each page of data resides in system memory (i.e. its address in system memory). The descriptor table may include a number of entries, with each entry including the address of a page in memory. Each entry may also specify a number of bytes, words, or d-words (double words). Each BME 18 may be configured to read the descriptor list, beginning with the top entry, thereby obtaining an address for a page in memory. During transmit operations, one or both BME's 18 (depending on whether host controller 10 is operating in single-pin mode or dual-pin mode) may read data from memory (through internal bus interface 25, as will be explained below) beginning with the address obtained from the descriptor table. The BME 18 may continue reading data from memory until it has read the number of bytes, words, or d-words specified by the entry in the descriptor table. Once all the specified data has been read, a BME 18 may then step to the next entry in the descriptor table, if necessary. The operation of each BME 18 in the receive data path is similar to that of each BME 18 in the transmit data path, with the exception that data is being written into system memory instead of being read from system memory.

Host controller 10 may include a power management unit 15, as shown in this embodiment. Power management unit 15 may be configured to monitor peripheral devices coupled to the peripheral bus. In some embodiments, power management unit 15 may be configured to cause power to be removed from the bus in when all peripheral devices attached to it are in an inactive state. An inactive state, in one embodiment, may be defined as when each peripheral device is currently idle, and the host computer system has no pending data transfers. In addition to powering down peripherals coupled to the bus, power management unit 15, in some embodiments, may power down various units of host controller 10 during idle times.

Host controller 10 may be coupled to internal bus interface 25. In various embodiments, internal bus interface 25 may be a bus bridge, which may allow a bus to interface with one or more other buses in a computer system, and may also couple host controller 10 to a processor of a computer system. In one embodiment, internal bus interface 25 is the input/output hub of a chipset. In this embodiment, internal bus interface may allow the DSL peripheral interconnect bus to communicate with other buses (and thus devices coupled to these buses). Such buses may include a PCI bus, a universal serial bus (USB), an advance graphics port (AGP) bus, and others. Internal bus interface 25 may also be coupled to a memory bus in the computer system, which may allow communications between system memory and devices coupled to the DSL peripheral interconnect bus. Host controller 10 may be coupled to internal bus interface 25 through bus master engines 18. In the embodiment shown, four bus master engines, two in the receive data path and two in the transmit data path, are coupled to internal bus interface 25. This may allow internal bus interface to function with host controller 10 for both single-pin and dual-pin operations on the DSL peripheral interconnect bus.

Internal bus interface 25 may also be coupled to control/status registers 19 and plug-and-play (PnP) configuration header 20, which are also functional units within host controller 10. Control/status register 19 may be configured to provide general control and status information concerning host controller 10 to the computer system through internal bus interface 25. Status information may include such information as the active/inactive status of devices coupled to the DSL peripheral interconnect bus, as well as host controller 10 itself. Control information may include such information as data rates at which host controller 10 may send and receive information from the computer system and/or the peripherals coupled to the DSL peripheral interconnect bus.

PnP configuration header 20 may be configured to provide information concerning specific devices coupled to the DSL peripheral interconnect bus to the bus bridge 25. PnP configuration header 20 may be configured to store information corresponding to devices attached to the DSL peripheral interconnect bus. Information for each device coupled to the DSL peripheral interconnect bus may be stored in a plurality of registers. Such registers may include identification registers, control registers, status registers, and base address registers. In one embodiment, at least one of each type of these registers may correspond to a device coupled to the DSL peripheral interconnect bus. PnP configuration header 20 may also be coupled to a battery in a computer system. This may allow information stored in the registers of PnP configuration header 20 to be retained if the computer operations are suspended by power management software or devices (i.e. when the computer enters a "sleep" mode).

Identification registers may be configured to store information which identifies the function of a device (e.g. a modem), the manufacturer of the device, and the revision of the device. This information may be read by a computer system in order to initialize driver software necessary for the device to function.

Status registers may be configured to various types of information relating to the status of a device attached to the bus. In one embodiment, status information may include the active/inactive status of a device, which may be used by power management circuitry when for decisions on whether to power down the device or the bus. Status registers may also store information concerning aborted transactions when the device is either acting as a target (i.e. receiving data) or as a source (i.e. sending information). This information may be used by the computer system if it is necessary to re-try the transaction.

Control registers may be configured to store various types of information related to the control of a device. In one embodiment, this information may include information relating to whether a device attached to the DSL peripheral interconnect bus has an I/O address space. Furthermore, information concerning the response of a device when the computer system accesses the device's I/O address space may also be stored in the control registers. The control registers may also store information concerning the response of a device when the computer system accesses memory space reserved for the device. The memory space reserved for a given device may be indicated by the contents of a base address register, which may be used to indicate the base address of system memory which may be reserved for the given device.

Other information stored in the control register may include latency timing information and interrupt information. Latency timing information may also be stored in the control registers. This information may indicate the length of time allowed by a device to respond to a request for data from the computer system or host controller 10. Interrupt information may include information indicating the expected response of the device to a interrupt generated by the computer system, as well as information which may indicate those conditions which may cause a device to generate an interrupt.

Moving now to FIG. 2A, a drawing of one embodiment of a transmit frame structure for a digital subscriber line (DSL) peripheral interconnect bus operating in a single-pin mode is shown. In single-pin mode, only a single transmission line (referred to as pin 0) is used to carry frames between host controller 10 and peripheral devices coupled to the DSL peripheral interconnect bus. Transmit frame 40A may be configured for carrying data from host controller 10 to a peripheral device attached to the DSL peripheral interconnect bus.

In the embodiment shown, transmit frame 40A includes 16 timeslots. Each of these timeslots is 16 bits in length. The first timeslot, slot 0, includes a frame/slot valid indication. The frame/slot valid indication in timeslot 0 may include one or more of the 16 bits in the timeslot. The frame/slot valid indication may be used to indicate the beginning boundary of transmit frame 40A to the peripheral receiving it. Slot 1 of transmit frame 40A may be used to carry write data to the receiving peripheral. Write data may be data that is written to a buffer, register, or other type of storage within the peripheral device. The presence of write data in slot 1 may be indicated by a write data bit in slot 0, as will be explained further below.

Slots 2 through 14 of transmit frame 40A may be used for carrying stream data. Transmit frame 40A may be configured for carrying up to two independent data streams. Each data stream may be of varying length, and either data stream may use the entire group of stream data timeslots. The division of timeslots between independent data streams will be explained further below in reference to FIG. 4.

Stream data may be any kind of data used or processed by a peripheral device. For example, if the peripheral device is a network interface card (NIC), stream data may include that information that is to be transmitted by from the NIC across the network to a server or other computer system. Similarly, stream data in receive frames (to be explained below) may be that data which is received by the NIC from a network.

Slot 15 of transmit frame 40A may be reserved for a command code. In the embodiment shown, the command code includes a 4-bit command field (bits 15–12) and a 12-bit parameter field (bits 11–0). The structure of timeslot 15 for this embodiment will be explained in further detail with reference to FIGS. 3A and 3B.

Moving now to FIG. 2B, a drawing of one embodiment of a transmit frame structure for a DSL peripheral interconnect bus operating in a dual-pin mode is shown. Transmit frame 40B, in the embodiment shown, may configured for transmission across a DSL peripheral interconnect bus operating in dual-pin mode. A first portion of the frame may be carried over pin 0, while a second portion of the frame may be carried over pin 1. In the embodiment shown, the portion of the frame carried over pin 0 may be identical to transmit frame 40A of FIG. 2A. That portion of the frame carried over pin 1 may include reserved slots in timeslot 0 and timeslot 15, while carrying write data in timeslot 1 and stream data in timeslots 2 through 14. The reserved timeslots of transmit frame 40B may be used for peripheral-specific functions in some embodiments, or may be reserved for future uses in others.

Operations in dual-pin mode may be especially useful when data to be transmitted is in a d-word format. In these situations, pin 0 may be used to carry bits 15:0 of the d-word, while pin 1 may be used to carry bits 31:16. Operations in dual-pin mode may allow for a higher volume of data to be transferred than operations in single-pin mode.

FIG. 2C is a drawing of one embodiment of a first timeslot of a transmits frame structure for a DSL peripheral interconnect bus. Timeslot 0 of a transmit frame includes a frame bit in bit position 15. This bit, when set, may be used to indicate the beginning of a new frame. Timeslot 0 in the embodiment shown is transmitted across pin 0, regardless of whether operations are in a single-pin mode or a dual-pin mode.

Bit position 14 of timeslot 0 may be used to carry a write-data bit, shown here as WrData. This bit may be used to indicate the presence of data that is to be written from the processor of the host computer system to a register or other storage mechanism within the peripheral device. The actual data to be written to the peripheral device may be sent in a timeslot of the next frame. Write data may be distinguished from stream data in that there is always an address associated with write data, wherein there is no address associated with stream data.

Figures 3A, 3B:
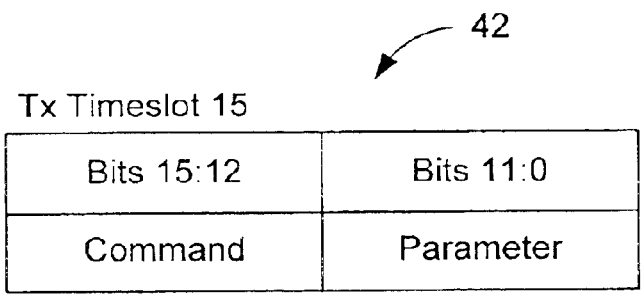
FIG. 3A is a drawing of one embodiment of a command structure for the transmit frames described in FIGS. 2A and 2B.
FIG. 3B is a table of a set of command codes for one embodiment of the command structure of FIG. 3A.

Turning now to FIG. 3A, a drawing of one embodiment of a command structure for the transmit frames described in FIGS. 2A and 2B is shown. Command timeslot 42 in this embodiment is timeslot 15 of a transmit frame, and may be transmitted across pin 0 regardless of whether the host controller is operating in single-pin mode or dual-pin mode. Other embodiments may place command timeslot 42 in a different timeslot of the frame. Bits 15:12 of the timeslot are used to indicate a command, while bits 11:0 are used to indicate a parameter. In one embodiment, the parameter may specify an address for a register access command. The parameter may also be peripheral specific. In some embodiments, the parameter may specify an address in the address space of the peripheral device, or other information that may be used by the peripheral device or its associated driver.

FIG. 3B is a table of a set of command codes for one embodiment of the command structure of FIG. 3A. The majority of the 4-bit command codes in the embodiment shown are read or write commands for data lengths of bytes (8 bits), words (16 bits) or d-words (32 bits). Each peripheral device may include storage mechanisms, such as registers or buffers for temporary storage of data needed to operate the device.

The command codes also include a peripheral specific code (1000). This code may be used to send a command to a specific peripheral device. For example, if the device is a modem, the peripheral specific command code may be used to instruct the modem to dial a predetermined phone number.

In the embodiment shown, command codes from 1111:1000 are reserved for future use. In various other embodiments, these command codes may be used to implement more commands, including more peripheral specific commands.

Moving now to FIG. 4, a table listing codes which indicate the division of independent data streams which may be conveyed in one embodiment of a data protocol structure for a timeslot bus. These codes are applicable to the transmit frame structures discussed in reference to FIGS. 2A and 2B. Additionally, these codes are applicable to the receive frame structures that will be discussed below in reference to FIGS. 5A and 5B.

As previously stated, each frame includes 13 timeslots reserved for carrying data streams. In the embodiment shown, two independent data streams, designated here as stream A and stream B, may be carried by each frame. Each independent stream may be up to 13 timeslots in length. Furthermore, if there is no data to be carried by a stream, no timeslots need be reserved for it. There may also be a number of extra unused timeslots in each frame, in which no data is carried.

Independent data stream A, in the embodiment shown, may begin in timeslot 2. Data stream A may then be transmitted, or received, and may end in the timeslot just prior to the beginning of independent data stream B. The beginning of independent data stream B may be indicated by a pointer. Following the reading of the pointer by either the peripheral device or the host controller (depending on whether the stream is being transmitted or received by the host controller), data stream B may then be transmitted or received. The transmission or reception of data stream B by the host controller may then continue until a second pointer is read by the peripheral device or host controller (i.e. the "unused" pointer). Timeslots transmitted or received after the unused pointer may be idle, and therefore contain no data.

The table of FIG. 4 may be used to illustrate data stream organization. For example, the code '0000' in the first row of the table indicates that timeslot 2 is carrying the pointer for stream B. Thus, stream A carries no data in this situation, while the sum of timeslots used by stream B and unused timeslots is 13. The code '0001' in the second row of the table indicates that the stream B pointer appears in timeslot 3. Thus, in this case, stream A is one timeslot long, and carries either 16 bits of information (in single-pin mode) or 32 bits of information (in dual-pin mode). The sum of stream B and unused timeslots in this case is 12. The code '1100' in the next-to-last entry of the table may indicate that stream A is 13 timeslots in length. In this case, stream B does not carry data in the same frame, and there are no unused timeslots.

The codes 1111:1101 of the table shown for this embodiment are reserved for future use. Other embodiments that employ these codes and carry more than two data streams are possible and contemplated.

Moving now to FIG. 5A, a drawing of one embodiment of a receive frame structure for a DSL peripheral interconnect bus operating in a single-pin mode is shown. Receive frames are those frames transmitted by a peripheral device across the bus, and received by a host controller. Receive frame 50A, in the embodiment shown, includes 16 timeslots of 16 bits each. The first timeslot, slot 0, includes a frame/slot valid indication. The frame/slot valid indication in timeslot 0 may include one or more of the 16 bits in the timeslot. The frame/slot valid indication may be used to indicate the beginning boundary of transmit frame 50A to the peripheral receiving it. Slot 1 of receive frame 50A may be used to carry read data from the transmitting peripheral. Read data may be data that is read from a buffer, register, or other type of storage within the peripheral device. The presence of read data in slot 1 may be indicated by a read data bit in slot 0, as will be explained further below.

Slots 2 through 14 of receive frame 50A may be used for carrying stream data. Receive frame 50A may be configured for carrying up to two independent data streams. Each data stream may be of varying length, and either data stream may use the entire group of stream data timeslots, as explained above in reference to FIG. 4.

Slot 15 of receive frame 50A includes a plurality of bits for interrupt requests, status reporting, and data requests. Slot 15 may include an interrupt request generated by a peripheral device, an interrupt cause code, a parameter, and requests for stream data from the host controller. Additional details about the information in slot 15 of this embodiment will be discussed below in reference to FIGS. 5D, 6A, and 6B.

Moving now to FIG. 5B, a drawing of one embodiment of a receive frame structure for a DSL peripheral interconnect bus operating in a dual-pin mode is shown. Receive frame 50B, in the embodiment shown, may configured for transmission across a DSL peripheral interconnect bus operating in dual-pin mode. A first portion of the frame may be carried over pin 0, while a second portion of the frame may be carried over pin 1. In the embodiment shown, the portion of the frame carried over pin 0 may be identical to receive frame 50A of FIG. 5A. When receive frame 50B is used to carry data in d-word formats, bits 15:0 may be transmitted across pin 0, while bits 31:16 of each d-word may be carried across pin 1. The portion of the frame carried over pin 1 may include reserved slots in timeslot 0 and timeslot 15, while carrying write data in timeslot 1 and stream data in timeslots 2 through 14. The reserved timeslots of transmit frame 50B may be used for peripheral-specific functions in some embodiments, or may be reserved for future uses in others.

FIG. 5C is a drawing of one embodiment of a first timeslot of a receive frame structure for a DSL peripheral interconnect bus. Timeslot 0 of a receive frame includes a frame bit in bit position 15. This bit, when set, may be used to indicate the beginning of a new frame. Timeslot 0 in the embodiment shown is carried across pin 0, regardless of whether operations are in a single-pin mode or a dual-pin mode.

Bit position 14 of timeslot 0 may be used to carry a read-data bit, shown here as RdData. This bit may be used to indicate the presence of data that is to be read by the processor of the host computer system from a register or other storage mechanism within the peripheral device. The actual data to be read from the peripheral device may be sent in a timeslot of the next frame. Read data may be distinguished from stream data in that there is always an address associated with read data, wherein there is no address associated with stream data.

Moving now to FIG. 5D, a drawing of one embodiment of a last timeslot of a receive frame structure, wherein the last frame includes information concerning interrupts as well as requests for data. Timeslot 15 of a receive frame may be configured to carry a plurality of bits indicating an interrupt request by a peripheral device, as well as the cause of the interrupt. Furthermore, the timeslot may include data request bits, which may indicate a request by a peripheral device for more stream data from the host controller. In the embodiment shown, bit 1, when set, may indicate a request for stream data to be sent via independent stream B, while bit 0, when set, may indicate a request for stream data to be sent via independent stream A. The information of timeslot 15 may be carried in a frame on pin 0, regardless of whether the host controller is operating in single-pin mode or dual-pin mode.

FIG. 6A is a drawing of one embodiment of an interrupt and status reporting structure in a last timeslot of a receive frame for a DSL peripheral interconnect bus. In the embodiment shown, timeslot 15 of a receive frame may be used to carry interrupt and status information. The interrupt and status information may be carried on pin 0 of a receive frame, regardless of whether the host controller is operating in single-pin mode or dual pin mode. Interrupt and status information may be read by host controller 10 and stored in registers located within the host controller. In one embodiment, control/status registers 19 of FIG. 1 may be used to store the interrupt and status information, which may then be read and acted upon by a processor of a computer system.

In the embodiment shown, bit 15 of timeslot 15, when set, may indicate a request by a peripheral device for an interrupt. The interrupt request bit may be active for a single frame only, thus allowing for additional interrupt requests to be sent. Bits 14:11 comprise a cause code, which may be used to indicate the cause of the interrupt. Bits 10:2 may be configured as a parameter field, which may be used by the host computer system to give more detailed information about the cause of the interrupt request. A processor in the host computer system may read the interrupt request bit, cause code, and parameter field from one or more register in host controller 10. This may advantageously allow the processor to determine the presence of an interrupt request, the cause for the request, and specific information about the cause (from the parameter field) without requiring the processor to conduct a read cycle on the actual peripheral bus. This may be advantageous in many computer system embodiments, as often times a processor bus operates at a much higher speed than does a peripheral bus, and thus a latency penalty resulting from a processor read on the actual peripheral bus may be avoided.

Bits 1:0 of the embodiment shown may be used to indicate a request by a peripheral for more stream data to be sent, as discussed above in reference to FIG. 5D.

Moving now to FIG. 6B, a list of codes indicating interrupt causes for one embodiment of an interrupt and status reporting structure is shown. As previously discussed, bits 14:11 of timeslot 15 in each receive frame may be used to indicate a cause of a requested interrupt.

In the embodiment shown, the code '0000' has an unspecified cause and no parameter field definition. In some computer system embodiments, this code may be ignored.

Cause code '0001' may be used to indicate the presence of a critical error. The parameter field associated with this may be an error code that provides additional information about the cause for the interrupt request. In many cases, the error code may be peripheral specific. In some cases, a critical error may result in the computer system discontinuing operation of the requesting peripheral if the error cannot be cleared by the processor.

Cause code '0010' may be used to indicate an interrupt request for a non-critical error. The associated parameter field may be an error code, and may also be peripheral specific. In general, a non-critical error may be cleared by a processor of the host computer system, thus allowing the requesting peripheral to continue normal operations.

Cause code '0011' may be used to indicate an interrupt request to notify the system of a general status change for the requesting peripheral device. The parameter field for this cause code may be the address of a status register, such as a register included in control/status registers 19 of FIG. 1. Examples of a general status change include a change in the active/inactive status of a device or the completion of a pending operation.

Cause codes '0100' and '0101' may be used to indicate an update of a general purpose input (GPI) for a given peripheral device. In the embodiment shown, these cause codes may be a special case, as peripherals coupled to the peripheral bus may be able to send GPI updates without setting the interrupt request bit. Some peripheral devices may include a number of general purpose I/O pins. Changes in their status may be reported back to the host controller using the associated cause codes without the need to generate an interrupt request by setting the interrupt request bit. In the embodiment shown, cause code '0100' may be used to indicate change in the state of a first group of 8 general purpose inputs. Cause code '0101' may be used to indicate a change in the state of a second group of general purpose inputs.

Cause codes '0110' and up are reserved for future use in the embodiment shown. Other embodiments which use these codes are possible and contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for reporting interrupt requests and status information from a peripheral device to a processor of a computer system, the method comprising:

transmitting an interrupt request bit from a peripheral device to a host controller across a peripheral bus;

transmitting an interrupt cause code from said peripheral device to said host controller across said peripheral bus;

transmitting a parameter field from said peripheral device to said host controller;

storing said interrupt request bit, said interrupt cause code, and said parameter field in one or more registers in said host controller, wherein said interrupt request bit, said interrupt cause code, and said parameter field are transmitted in a timeslot of a frame, wherein the cause code is indicative of a cause of a corresponding interrupt, and wherein the parameter field provides further information about the cause of the corresponding interrupt; and reading said interrupt request bit, said interrupt cause code, and said parameter field from said one or more registers, wherein said reading is performed by said processor.

2. The method as recited in claim 1, wherein said timeslot includes sixteen bits.

3. The method as recited in claim 2, wherein said frame includes sixteen timeslots.

4. The method as recited in claim 3, wherein said interrupt request bit, said interrupt cause code, and said parameter field are transmitted in a last timeslot of said frame.

5. The method as recited in claim 1, wherein an interrupt request from said peripheral device is indicated when said interrupt request bit is set.

6. The method as recited in claim 5, wherein said interrupt request bit is active for a single frame.

7. The method as recited in claim 1 further comprising requesting data to be transmitted from said host controller to said peripheral device, said requesting data indicated by one or more data request bits.

8. The method as recited in claim 7, wherein said data request bits are transmitted from said peripheral to said host controller in said timeslot of said frame.

9. The method as recited in claim 8, wherein said timeslot includes a first bit for requesting transmission of a first data stream, and wherein a request for said first data stream is indicated responsive to said first bit being set.

10. The method as recited in claim 9, wherein said timeslot includes a second bit for requesting transmission of a second data stream, and wherein a request for said second data stream is indicated responsive to said second bit being set.

11. The method as recited in claim 1, wherein said peripheral bus is a digital subscriber line (DSL) peripheral interconnect bus.

12. A computer system comprising:
a processor;
a host controller coupled to said processor;
at least one peripheral device coupled to said host controller through a peripheral bus, wherein said peripheral bus is a timeslot bus, and wherein said peripheral device is configured to:
transmit an interrupt request bit to said host controller across said peripheral bus;
transmit an interrupt cause code to said host controller across said peripheral bus; and
transmit a parameter field from said peripheral device to said host controller;
wherein the cause code is indicative of a cause of a corresponding interrupt and wherein the parameter field provides further information about the cause of the corresponding interrupt;
wherein said host controller is configured to store said interrupt request bit, said interrupt cause code, and said parameter field; and
wherein said processor is configured to read said interrupt request bit, said interrupt cause code, and said parameter field.

13. The computer system as recited in claim 12, wherein said host controller includes a plurality of registers, said plurality of register configured for storing said interrupt request bit, said interrupt cause code, and parameter field.

14. The computer system as recited in claim 12, wherein said interrupt request bit, said interrupt cause code, and said parameter field are transmitted in a timeslot of a frame.

15. The computer system as recited in claim 14, wherein said timeslot includes sixteen bits.

16. The computer system as recited in claim 15, wherein said frame includes sixteen timeslots.

17. The computer system as recited in claim 12, wherein said peripheral device is configured to indicate an interrupt request by setting said interrupt request bit.

18. The computer system as recited in claim 17, wherein said interrupt request bit is active for a single frame.

19. The computer system as recited in claim 14, wherein said peripheral device is further configured to transmit a data request to said host controller, said data request transmitted in said timeslot.

20. The computer system as recited in claim 19, wherein said peripheral device is configured to transmit a first data request bit in said timeslot, said first data request bit indicating a request by said peripheral device for a first data stream.

21. The computer system as recited in claim 20, wherein said peripheral device is configured to transmit a second data request bit in said timeslot, said second data request bit indicating a request by said peripheral device for a second data stream.

22. The computer system as recited in claim 12, wherein said peripheral bus is a digital subscriber line (DSL) peripheral interconnect bus.

23. The computer system as recited in claim 22, wherein said DSL peripheral interconnect bus is configured for operations in a single-pin mode or a dual-pin mode.

* * * * *